United States Patent
Lin et al.

(10) Patent No.: US 12,200,720 B2
(45) Date of Patent: Jan. 14, 2025

(54) INFORMATION PROCESSING METHOD AND DEVICE, EQUIPMENT, AND STORAGE MEDIUM

(71) Applicant: GUANGDONG OPPO MOBILE TELECOMMUNICATIONS CORP., LTD., Dongguan (CN)

(72) Inventors: Yanan Lin, Dongguan (CN); Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 338 days.

(21) Appl. No.: 17/565,708

(22) Filed: Dec. 30, 2021

(65) Prior Publication Data
US 2022/0124690 A1   Apr. 21, 2022

Related U.S. Application Data

(63) Continuation of application No. PCT/CN2019/116779, filed on Nov. 8, 2019.

(51) Int. Cl.
 *H04W 72/23* (2023.01)
 *H04L 1/1607* (2023.01)

(52) U.S. Cl.
 CPC ........... *H04W 72/23* (2023.01); *H04L 1/1607* (2013.01)

(58) Field of Classification Search
None
See application file for complete search history.

(56) References Cited

U.S. PATENT DOCUMENTS

| 2005/0094802 A1* | 5/2005 | Ahmed | H04M 11/06 379/399.01 |
| 2018/0279274 A1* | 9/2018 | Sun | H04W 52/367 |
| 2020/0337072 A1* | 10/2020 | Lunttila | H04L 5/0012 |

FOREIGN PATENT DOCUMENTS

| CN | 108781143 A | 11/2018 |
| CN | 109150476 A | 1/2019 |
| CN | 111886911 B * | 3/2022 |
| EP | 3322231 A1 | 5/2018 |

(Continued)

OTHER PUBLICATIONS

International Search Report of PCT/CN2019/116779, mailed from China National Intellectual Property Administration on Jun. 28, 2020.

(Continued)

*Primary Examiner* — Chi H Pham
*Assistant Examiner* — Raul Rivas
(74) *Attorney, Agent, or Firm* — Sheppard, Mullin, Richter & Hampton LLP (57) ABSTRACT

The present application provides an information processing method and device, equipment and a storage medium, which relate to the technical field of communications. The method comprises the following steps: receiving a first signaling, wherein the first signaling is used for instructing a terminal to transmit feedback information corresponding to a first downlink physical channel group through a first uplink physical resource; and before the first uplink physical resource, not obtaining a second signaling., wherein the second signaling is used for indicating new feedback indication information corresponding to the first downlink physical channel group.

9 Claims, 4 Drawing Sheets

Receive a first signaling, the first signaling being used for indicating a terminal to transmit feedback information corresponding to a first downlink physical channel group on a first uplink physical resource — 601

Cancel transmission of the feedback information on the first uplink physical resource is cancelled when a second signaling is received before the first uplink physical resource, the second signaling being used for indicating new feedback indication information corresponding to the first downlink physical channel group — 602

(56) References Cited

FOREIGN PATENT DOCUMENTS

| EP | 3994823 A1 | 1/2021 |
| EP | 3926869 A1 | 12/2021 |

OTHER PUBLICATIONS

Nokia, Nokia Shanghai Bell, "Discussion on enhancements to scheduling/HARQ for NR URLL," R1-1910853, 3GPP TSG RAN WG1 Meeting #98bis, Chongqing, China, Oct. 14-20, 2019.
MCC Support, "Final Report of 3GPP TSG RAN WG1 #98bis v2.0.0 (Chongqing, China, Oct. 14-20, 2019)," R1-1913275, 3GPP TSG RAN WG1 Meeting #99, Reno, USA, Nov. 18-22, 2019.
First Office Action issued in Japanese Patent Application No. 2022-512458, Notice of Reasons for Refusal, issued Sep. 1, 2023.
Decision of Rejection issued in Chinese Application No. 2022101457875, issued Sep. 19, 2023.
Second Office Action issued in Chinese Application No. 2022101457875, issued Jul. 12, 2023.
Xiaomi, R1-1911295, "Discussion on HARQ enhancement for NR-U," 3GPP TSG RAN WG1 #98b, Chongqing, China, Oct. 14-20, 2019.
Huawei, HiSilicon, R1-1910055, Sidelink resource allocation mode 1, 3GPP TSG RAN WG1 Meeting #98bis, Chongqing, China, Oct. 14-20, 2019.
First Office Action of Canadian Application No. 3147128, dated Mar. 29, 2023.
Examination Report of European Patent Application No. 19951565.1, dated Feb. 16, 2023.
First Office Action of Chinese Application No. 202210145787.5, dated Apr. 14, 2023.
Draft Minutes report, R1-190xxxx, 3GPP TSG RAN WG1 Meeting #98, Prague, Czech Rep, Aug. 26-30, 2019.
Qualcomm Incorporated, R1-1811254, Enhancements to Scheduling and HARQ operation for NR-U, 3GPP TSG RAN WG1 Meeting #94bis, Chengdu, China, Oct. 6-Oct. 12, 2018.
Huawei, HiSilicon, R1-1910095, Remaining issues of additional SRS symbols in normal UL subframe, 3GPP TSG RAN WG1 Meeting #98bis, Chongqing, China, Oct. 14-20, 2019.
Extended European Search Report for European Application No. 19951565.1, dated Jun. 28, 2022.
First Examination Report issued in Indian Patent Application No. 202127061593, dated Jul. 25, 2022.
Huawei, R1-1905649, Feature lead summary of HARQ enhancements for NR-U, 3GPP TSG RAN WG1 Meeting #96bis, Xi'an, China, Apr. 8-12, 2019.
Nokia, Nokia Shanghai Bell, R1-1910596, Remaining issues on NR-U HARQ scheduling and feedback, 3GPP TSG RAN WG1 #98bis, Chongqing, China, Oct. 14-20, 2019.
LG Electronics, R1-1910821, HARO procedure for NR-U, 3GPP TSG RAN WG1 #98bis, Chongqing, China, Oct. 14-20, 2019.
MediaTek Inc., R1-1911054, Enhancements to HARQ for NR-U operation, 3GPP TSG RAN WG1 #98bis, Chongqing, China, Oct. 14-20, 2019.
Hearing Notice for Indian Application No. 202127061593 mailed on Jun. 19, 2024.
Controller Decision for Indian Application No. 202127061593 mailed on Jul. 22, 2024.

* cited by examiner

| Receive a first signaling, the first signaling being used for indicating a terminal to transmit feedback information corresponding to a first downlink physical channel group on a first uplink physical resource | 301 |

| Not acquire a second signaling before the first uplink physical resource, the second signaling being used for indicating new feedback indication information corresponding to the first downlink physical channel group | 302 |

INFORMATION PROCESSING METHOD AND DEVICE, EQUIPMENT, AND STORAGE MEDIUM

CROSS-REFERENCE TO RELATED APPLICATION

The present application is a continuation application of International PCT Application No. PCT/CN2019/116779, filed on Nov. 8, 2019, the entire content of which is hereby incorporated by reference.

TECHNICAL FIELD

The present application relates to the field of communication technologies, in particular to an information processing method and apparatus, a device, and a storage medium.

BACKGROUND

Hybrid Automatic Repeat Request (HARQ) is a technology that can ensure reliable data transmission. In a HARQ technology, a base station schedules, through Downlink Control Information (DCI), a terminal to send downlink data, and the terminal sends feedback information corresponding to the downlink data to the base station. Exemplarily, the feedback information includes Acknowledgement (ACK) information or Negative Acknowledgement (NACK) information, and the base station sends new data or retransmits data according to the feedback information.

At present, a New Radio-based Access to Unlicensed Spectrum (NR-U) system supports a group-based feedback mode of feedback information, i.e., a base station may indicate, through DCI, a group to which a scheduled downlink physical channel belongs. For a terminal, when the terminal receives a trigger signaling from the base station, the terminal will send, to the base station, feedback information corresponding to downlink physical channels belonging to the group. Further, the DCI may also include new feedback indication information for a group, which is used for indicating the terminal to regenerate a group corresponding to a downlink physical channel scheduled through the DCI or regenerate a feedback codebook (HARQ-ACK codebook) of a group corresponding to a downlink physical channel scheduled through the DCI, wherein the feedback codebook is generated based on feedback information in the group.

However, when the terminal receives DCI before sending feedback information and the DCI indicates to regenerate the group or feedback codebook corresponding to the group, which operation the terminal should perform has become a hot topic of research.

SUMMARY

Embodiments of the present application provide an information processing method and apparatus, a device, and a storage medium, which may be used for solving a problem of which operation a terminal should perform in related technologies. The technical solutions are as follows.

In one aspect, an information processing method is provided, the method including: receiving a first signaling, the first signaling being used for indicating a terminal to transmit feedback information corresponding to a first downlink physical channel group on a first uplink physical resource; and not acquiring a second signaling before the first uplink physical resource, the second signaling being used for indicating new feedback indication information corresponding to the first downlink physical channel group.

In another aspect, an information processing method is provided, the method including: receiving a first signaling, the first signaling being used for indicating a terminal to transmit feedback information corresponding to a first downlink physical channel group on a first uplink physical resource; and canceling transmission of the feedback information on the first uplink physical resource when a second signaling is received before the first uplink physical resource, the second signaling being used for indicating new feedback indication information corresponding to the first downlink physical channel group.

In another aspect, an information processing method is provided, the method including: sending a first signaling, the first signaling being used for indicating a terminal to transmit feedback information corresponding to a first downlink physical channel group on a first uplink physical resource; and sending a second signaling before the first uplink physical resource, the second signaling being used for indicating to cancel transmitting the feedback information on the first uplink physical resource.

In a possible implementation of the present application, the method further includes: not receiving the feedback information on the first uplink physical resource.

In another aspect, an information processing apparatus is provided, the apparatus including: a first receiving module, configured to receive a first signaling, the first signaling being used for indicating a terminal to transmit feedback information corresponding to a first downlink physical channel group on a first uplink physical resource; and a control module, configured to not acquire a second signaling before the first uplink physical resource, the second signaling being used for indicating new feedback indication information corresponding to the first downlink physical channel group.

In another aspect, an information processing apparatus is provided, the apparatus including: a second receiving module, configured to receive a first signaling, the first signaling being used for indicating a terminal to transmit feedback information corresponding to a first downlink physical channel group on a first uplink physical resource; and a canceling module, configured to cancel transmission of the feedback information on the first uplink physical resource when a second signaling is received before the first uplink physical resource, the second signaling being used for indicating new feedback indication information corresponding to the first downlink physical channel group.

In another aspect, an information processing apparatus is provided, the apparatus including: a first sending module, configured to send a first signaling, the first signaling being used for indicating a terminal to transmit feedback information corresponding to a first downlink physical channel group on a first uplink physical resource; and a second sending module, configured to send a second signaling before the first uplink physical resource, the second signaling being used for indicating to cancel transmission of the feedback information on the first uplink physical resource.

In a possible implementation of the present application, the second sending module is further configured to: not receive the feedback information on the first uplink physical resource.

In another aspect, a device is provided, the device includes a processor and a memory, the memory stores at least one instruction, and the at least one instruction is configured to be executed by the processor to implement the method provided in any of the above one aspect, or to implement the method provided in any of the above another aspects.

In another aspect, a computer-readable storage medium is provided, the computer-readable storage medium stores at least one instruction, and the at least one instruction is configured to be executed by a processor to implement the method provided in any of the above one aspect, or to implement the method provided in any of the above another aspects.

In another aspect, a computer program product is provided, the computer program product includes one or more computer programs, which, when executed by a processor, are configured to implement the method provided in any of the above one aspect, or to implement the method provided in any of the above another aspects.

Beneficial effects brought by the technical solutions according to the embodiments of the present application at least include the followings.

A first signaling is received, and it is determined to transmit feedback information corresponding to a first downlink physical channel group on a first uplink physical resource according to the first signaling. Before the first uplink physical resource, a second signaling may not be acquired or may not be expected to be received, the second signaling being used for indicating new feedback indication information corresponding to the first downlink physical channel group. That is, if the second signaling is received before the first uplink physical resource, the second signaling is ignored.

BRIEF DESCRIPTION OF DRAWINGS

To describe technical solutions in embodiments of the present application more clearly, drawings that need to be used in the description of the embodiments will be briefly introduced below. It is apparent that the drawings described below are only some embodiments of the present application, and for those of ordinary skills in the art, other drawings may be obtained according to these drawings without paying an inventive effort.

DETAILED DESCRIPTION

To make objects, technical solutions, and advantages of the present application clearer, implementations of the present application will be further described in detail below with reference to the accompanying drawings.

Before detailed description is made on the information processing method according to an embodiment of the present application, a brief introduction is made to terminologies, application scenarios, and implementation environments involved in the embodiments of the present application.

First, a brief introduction is made to the terminologies involved in the embodiments of the present application.

Unlicensed spectrum: it is generally regarded as a shared spectrum, that is, communication devices in different communication systems may use the unlicensed spectrum without a need to apply to a government for a dedicated spectrum authority, as long as they meet regulatory requirements set by a country or region on the unlicensed spectrum.

Physical Downlink Control Channel (PDCCH): it is a set of physical resource elements, belongs a kind of downlink physical channels, and may be used for carrying DCI. According to different action scopes of a PDCCH, control information carried through the PDCCH channel includes public control information and dedicated control information. Physical Downlink Shared Channel (PDSCH): it belongs a kind of downlink physical channels and is a downlink channel for carrying user data, and all user data may be carried using the PDSCH.

Physical Uplink Control Channel (PUCCH): it belongs a kind of physical uplink channels, and may be mainly used for transmitting ACK information, NACK information, Channel Quality Indication (CQI), a Precoding Matrix Indicator (PMI), or Rank Indication (RI).

Second, a brief introduction is made to the application scenarios involved in the embodiments of the present application.

As an example, a method according to an embodiment of the present application may be applied to a service scenario of an unlicensed spectrum. In order to enable various communication systems using the unlicensed spectrum for wireless communication to coexist amicably on this unlicensed spectrum, some countries or regions have stipulated regulatory requirements that must be met for using an unlicensed spectrum. For example, a "Listen-Before-Talk (LBT)" principle shall be followed, that is, before transmitting a signal on a channel of an unlicensed spectrum, a communication device needs to conduct channel listening first, and the communication device can transmit the signal only when a result of the channel listening is that a channel is idle; and if the result of the channel listening by the communication device on the channel of the unlicensed spectrum is that the channel is busy, the communication device cannot transmit the signal. In addition, in order to ensure fairness, in one transmission, a time length in which the communication device uses a channel of an unlicensed spectrum for signal transmission cannot exceed Maximum Channel Occupation Time (MCOT).

At present, NR-U of Rel-16 supports a group-based ACK/NACK feedback mode. In implementation, a network side device may indicate, through DCI, a group to which a PDSCH scheduled by the DCI or a PDCCH carrying the DCI belongs. When the network side device sends a trigger signaling to indicate a terminal to feed back feedback information corresponding to a group, the terminal feeds back feedback information corresponding to a PDSCH or PDCCH belonging to the group to the network side device. Exemplarily, the terminal may generate a feedback codebook according to a format based on the feedback information corresponding to the PDSCH or PDCCH of the group, and then send the feedback codebook to the network side device, wherein the feedback information includes ACK information or NACK information. Further, the network side device may trigger the terminal multiple times to send feedback information of a group, i.e., achieve retransmission of the feedback information.

In addition, in order to ensure that a network side device and a terminal have same understanding for a quantity of bits of feedback information (or an amount of feedback information) corresponding to a group, a Downlink Assignment Index (DAI) corresponding to each downlink physical channel may be independently counted in each group. The DAI may be used for indicating how many times a downlink physical channel is currently scheduled, so that the terminal can detect whether downlink data is missed.

Figure 1:
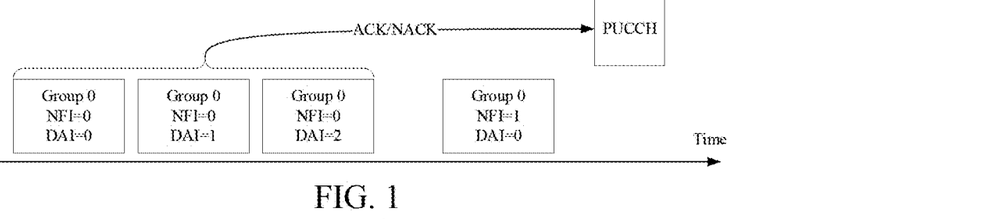
FIG. 1 is a schematic diagram of information corresponding to a downlink physical channel group according to an exemplary embodiment of the present application.

Further, the DCI may also include new feedback indication information, so as to indicate, through the new feedback indication information, the terminal to regenerate a group corresponding to a downlink physical channel scheduled through the DCI or regenerate a feedback codebook of a group corresponding to a downlink physical channel scheduled through the DCI. As an example, the new feedback indication information may be indicated through New Feedback Information (NFI). Exemplarily, referring to FIG. 1, group 0 corresponds to three pieces of DCI with NFI being equal to 0, and after ACK/NACK corresponding to a PDSCH scheduled through the three pieces of DCI is successfully fed back through a PUCCH, a network side device may set NFI to be 1 in subsequent scheduling of group 0, which means that group 0 corresponds to a downlink physical channel group again. In such a case, the terminal releases previous ACK/NACK corresponding to NFI=0, and regenerates a feedback codebook corresponding to the downlink physical channel group.

Next, a brief introduction is made to the implementation environments involved in the embodiments of the present application.

Figure 2:
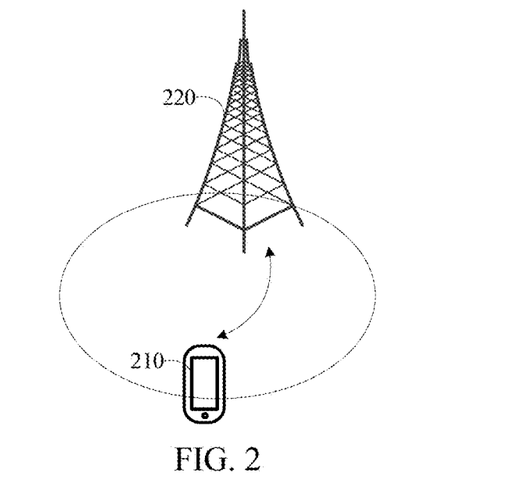
FIG. 2 is a schematic diagram of an implementation environment according to an exemplary embodiment of the present application.

Referring to FIG. 2, FIG. 2 is a schematic diagram of an implementation environment according to an exemplary embodiment. The implementation environment mainly includes a terminal 210 and a network side device 220. The terminal 210 and the network side device 220 may perform data communication through a communication network.

The terminal 210 may be any device that can be used for data communication, for example, may be a device such as a handheld terminal and a tablet computer. In some embodiments, the terminal 210 is also called a User Equipment (UE).

The network side device 220 may be used for providing services for the terminal 210. As an example, in a New Radio (NR) system, the network side device 220 may be an evolutional Node B (eNB), etc., which is not limited in the embodiments of the present application.

In addition, the implementation environment may include a plurality of terminals and a plurality of network side devices. FIG. 2 only shows one terminal and one network side device.

After the introduction of the terminologies, the application scenarios, and the implementation environments involved in the embodiments of the present application, an information processing method according to an embodiment of the present application will be described in detail with reference to the accompanying drawings.

Figure 3:
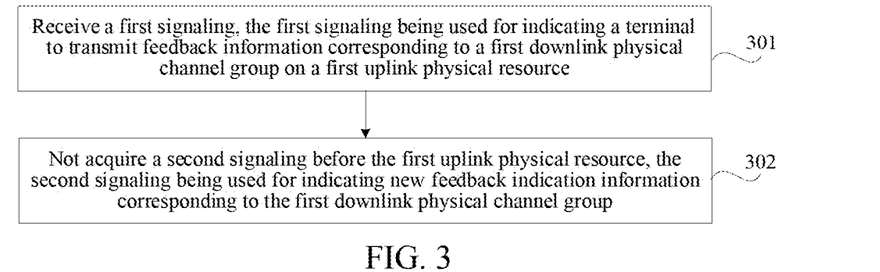
FIG. 3 is a flowchart of an information processing method according to an exemplary embodiment of the present application.

Referring to FIG. 3, FIG. 3 is a flowchart of an information processing method according to an exemplary embodiment. The information processing method may be applied to the implementation environment shown in FIG. 2, and may include the following implementation acts 301 and 302.

In act 301, a first signaling is received, the first signaling being used for indicating a terminal to transmit feedback information corresponding to a first downlink physical channel group on a first uplink physical resource.

A first downlink physical channel in the first downlink physical channel group may be a PDSCH or a PDCCH.

As an example, the first signaling may be first DCI, and the first DCI includes resource indication information for indicating the first uplink physical resource. For example, the resource indication information may include time domain information and/or frequency domain information of the first uplink physical resource. That is, the first DCI may be used for indicating which uplink physical resource the terminal uses to feed back the feedback information corresponding to the first downlink physical channel group.

As an example, the first DCI may further include NFI, for example, the NFI is "0".

In addition, the first signaling further includes group information of the first downlink physical channel group, for example, the group information may be a group number, etc., for example, the group information is group 0. The first signaling may further include a DAI, and the DAI is used for indicating how many times scheduling is currently performed.

In addition, the first signaling has a trigger function and is used for indicating the terminal to send feedback information corresponding to the first downlink physical channel group.

Figure 4:
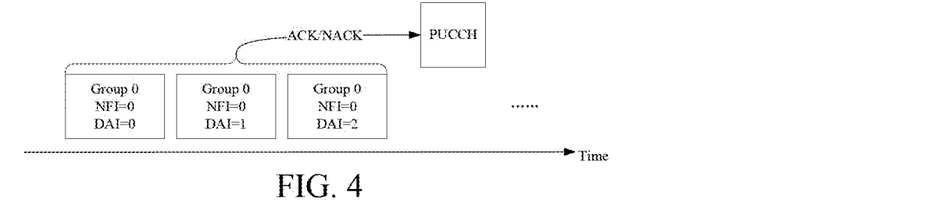
FIG. 4 is a schematic diagram of information corresponding to a downlink physical channel group according to another exemplary embodiment of the present application.

For example, as shown in FIG. 4, information in FIG. 4 comes from three pieces of DCI, and a first downlink physical channel group scheduled through each DCI is group 0, NFI of each of the three pieces of DCI is "0", and DAIs of the three pieces of DCI are 0, 1, and 2 respectively, wherein DCI with a DAI being equal to 2 is the first signaling, i.e., having a trigger function and used for indicating the terminal to transmit feedback information corresponding to the group 0.

In act 302, a second signaling is not acquired before the first uplink physical resource, the second signaling being used for indicating new feedback indication information corresponding to the first downlink physical channel group.

Exemplarily, the new feedback indication information may be indicated through NFI. As an example, the first signaling is first DCI, and the second signaling is second DCI. New feedback indication information in the second DCI is toggled relative to new feedback indication information in the first DCI. For example, NFI in the second DCI is different from NFI in the first DCI.

That is to say, the new feedback indication information may be represented through NFI toggling. For example, when the NFI in the first DCI is "0", if the NFI in the second DCI is "1", the second DCI is used for indicating new feedback indication information corresponding to the first downlink physical channel group, i.e., indicating the terminal to regenerate a group corresponding to a downlink physical channel scheduled through the DCI or to regenerate a feedback codebook of a group corresponding to a downlink physical channel scheduled through the DCI.

Further, a case where the second signaling is not acquired may mean: the second signaling is not detected; or an operation indicated by the second signaling is not performed.

That is to say, the second signaling may not be detected before the first uplink physical resource. For example, if a separate physical channel is used for transmitting the second signaling, before the first uplink physical resource the terminal may not detect the physical channel carrying the second signaling.

Or, an operation indicated by the second signaling may not be performed before the first uplink physical resource. For example, the second signaling may be sent together with other information on a same physical resource, and at this time, the terminal also detects the second signaling out when the terminal detects the other information. For the terminal, although the second signaling is also detected out, the second signaling may be ignored, i.e., an operation indicated by the second signaling is not performed.

To sum up, that the second signaling is not acquired before the first uplink physical resource may be generalized as: the second signaling is not expected to be received before the first uplink physical resource.

It should be noted that for a statement "before the first uplink physical resource", a time domain of the first uplink physical resource is mainly concerned here. In a possible implementation of the present application, the following two cases are included before the first uplink physical resource.

One case is before a starting symbol of the first uplink physical resource.

That is to say, the terminal does not acquire the second signaling or does not expect to receive the second signaling before the starting symbol of the first uplink physical resource.

It should be noted here that the starting symbol and an ending symbol mentioned in the present application actually refer to a time domain position corresponding to the starting symbol and a time domain position corresponding to the ending symbol, and the same applies below.

The other case is before an ending symbol of the first uplink physical resource.

In this case, the terminal does not acquire the second signaling or does not expect to receive the second signaling before the ending symbol of the first uplink physical resource.

As an example, a specific implementation of not acquiring the second signaling before the first uplink physical resource may further include: not acquiring the second signaling between a physical channel carrying the first signaling and the first uplink physical resource.

That is to say, a time range may be determined in which the second signaling is not acquired. A lower limit of the time range is determined based on time information corresponding to the physical channel carrying the first signaling, and an upper limit of the time range is determined based on time domain information corresponding to the first uplink physical resource.

As an example, not acquiring the second signaling between the physical channel carrying the first signaling and the first uplink physical resource, may include the following several possible implementations.

In a possible implementation, the second signaling is not acquired between an ending symbol of the physical channel carrying the first signaling and a starting symbol of the first uplink physical resource.

That is to say, the second singaling may not be acquired or may not be expected to be received in a time range from the ending symbol of the physical channel carrying the first signaling to the starting symbol of the first uplink physical resource.

In another possible implementation, the second signaling is not acquired between an ending symbol of the physical channel carrying the first signaling and an ending symbol of the first uplink physical resource.

That is to say, the second signaling may not be acquired or may not be expected to be received in a time range from the ending symbol of the physical channel carrying the first signaling to the ending symbol of the first uplink physical resource.

It should be noted that the above implementations of not acquiring the second signaling between the physical channel carrying the first signaling and the first uplink physical resource are only exemplary. In some embodiments, a specific implementation may further include: not acquiring the second signaling between a starting symbol of the physical channel carrying the first signaling and a starting symbol of the first uplink physical resource; or, not acquiring the second signaling between a starting symbol of the physical channel carrying the first signaling and an ending symbol of the first uplink physical resource.

Further, the terminal may receive a third signaling before the first uplink physical resource (or between the physical channel carrying the first signaling and the first uplink physical resource). The third signaling includes the above group information, and NFI information in the third signaling is the same as NFI information in the first signaling. As an example, the terminal may transmit, on another physical resource after the first uplink physical resource, feedback information corresponding to a group scheduled through the third signaling, which may specifically depend on an indication of a subsequent trigger signaling.

In an embodiment of the present application, a first signaling is received, and it is determined to transmit feedback information corresponding to a first downlink physical channel group on a first uplink physical resource according to the first signaling. Before the first uplink physical resource, a second signaling may not be acquired or may not be expected to be received, and the second signaling is used for indicating new feedback indication information corresponding to the first downlink physical channel group. That is, if the second signaling is received before the first uplink physical resource, the second signaling is ignored.

Figure 5:
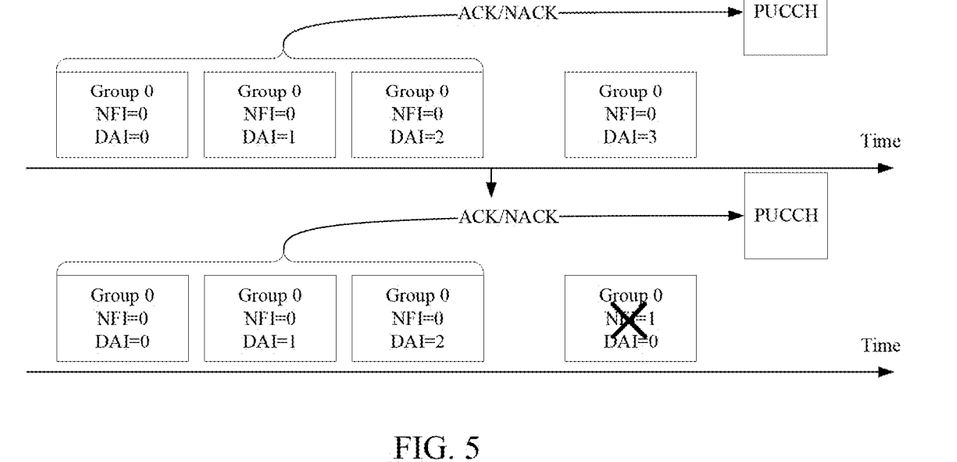
FIG. 5 is a schematic diagram of information corresponding to a downlink physical channel group according to another exemplary embodiment of the present application.

For convenience of understanding, description will be made next with a specific example. Referring to FIG. 5, a specific flow includes the following contents.

1. A terminal receives a first signaling having a trigger function, wherein the first signaling is used for indicating the terminal to send feedback information corresponding to a group in which a downlink physical channel scheduled by itself is.

For example, the first signaling may be DCI scheduling a PDSCH, wherein the scheduled PDSCH corresponds to Group 0, NFI=0, and DAI=2.

2. ACK/NACK information corresponding to a downlink physical channel with a DAI being equal to 0~2 in group 0 (NFI=0) is determined.

3. Before the first uplink physical resource PUCCH or between the first uplink physical resource PUCCH and a physical channel carrying the first signaling, the terminal does not expect to receive a second signaling, wherein the second signaling indicates group 0 and also indicates NFI=1, i.e., NFI is toggled.

4. The terminal may receive a third signaling before the PUCCH or between the first uplink physical resource PUCCH and the physical channel carrying the first signaling, wherein the third signaling indicates group 0, but NFI=0, i.e., a base station adds a new PDSCH to PDSCH group 0, and ACK/NACK information corresponding to the third signaling may be transmitted on another physical resource other than the first uplink physical resource PUCCH, which specifically depends on an indication of a subsequent trigger signaling.

Figure 6:
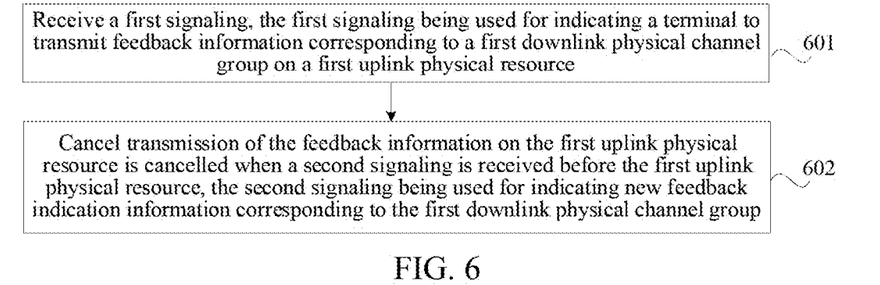
FIG. 6 is a flowchart of an information processing method according to another exemplary embodiment of the present application.

Referring to FIG. 6, FIG. 6 is a flowchart of an information processing method according to another exemplary embodiment. The information processing method may be applied to the implementation environment shown in FIG. 2, and the method may include the following implementation acts 601 and 602.

In act 601, a first signaling is received, the first signaling being used for indicating a terminal to transmit feedback information corresponding to a first downlink physical channel group on a first uplink physical resource.

As an example, a first downlink physical channel in the first downlink physical channel group is a PDSCH or a PDCCH.

For a specific implementation of this act, reference may be made to the act 301 in the embodiment shown in FIG. 3.

In act 602, transmission of the feedback information on the first uplink physical resource is cancelled when a second signaling is received before the first uplink physical resource, the second signaling being used for indicating new feedback indication information corresponding to the first downlink physical channel group.

Exemplarily, the new feedback indication information may be indicated through NFI. In a possible implementation of the present application, the first signaling is first downlink control information (DCI), the second signaling is second DCI, and the new feedback indication information in the second DCI is toggled relative to the new feedback indication information in the first DCI.

That is to say, the new feedback indication information may be represented through NFI toggling. For example, when NFI in the first DCI is "0", if NFI in the second DCI is "1", at this time the second DCI is used for indicating the new feedback indication information corresponding to the first downlink physical channel group, i.e., indicating the terminal to regenerate a group corresponding to a downlink physical channel scheduled through the DCI or to regenerate a feedback codebook of a group corresponding to a downlink physical channel scheduled through the DCI.

In some embodiments, the above cancelling transmission of the feedback information on the first uplink physical resource may also be interpreted as skipping transmission of the feedback information on the first uplink physical resource, or as dropping transmission of the feedback information on the first uplink physical resource, or as puncturing a physical channel carrying the feedback information on the first uplink physical resource. Further, after the terminal cancels transmission of the feedback information on the first uplink physical resource, the feedback information corresponding to the first downlink physical channel group may be released.

As an example, the canceling transmission of the feedback information on the first uplink physical resource may refer to: cancelling all transmission of the feedback information on the first uplink physical resource.

That is to say, if the terminal receives the second signaling before the first uplink physical resource, the terminal may not send the feedback information on the first uplink physical resource.

As another example, a specific implementation of the cancelling transmission of the feedback information on the first uplink physical resource may further include: cancelling partial transmission of the feedback information on the first uplink physical resource.

That is to say, the terminal may transmit the feedback information starting from a starting symbol of the first uplink physical resource, and during transmission, the terminal may interrupt or stop the transmission of the feedback information on the first uplink physical resource, thereby achieving cancelling partial transmission of the feedback information on the first uplink physical resource.

Further, a specific implementation of cancelling transmission of the feedback information on the first uplink physical resource may include: cancelling transmission of the feedback information on the first uplink physical resource if a time interval between a physical channel carrying the second signaling and the first uplink physical resource is greater than or equal to a first time length threshold.

As an example, the first time length threshold is a downlink physical channel processing time length. Or, the first time length threshold is configured by a network side device. Or, the first time length threshold is predefined.

Generally, the downlink physical channel processing time length may be expressed as PDSCH processing time, which refers to a maximum time length for processing a PDSCH. For example, when the downlink physical channel processing time length is 5 milliseconds, it means that a terminal needs to finish processing a PDSCH within 5 milliseconds.

When the first time length threshold is configured by a network side device, the network side device may configure it through a high-layer signaling. In addition, when the first time length threshold is configured by the network side device or is predefined, the first time length threshold may be less than or equal to a downlink physical channel processing time length.

Since it takes certain processing time for a terminal to stop transmission of feedback information on the first uplink physical resource, if a Mile interval between a physical channel carrying the second signaling and the first uplink physical resource is greater than or equal to a first time length threshold, it means that the terminal has sufficient time to stop to process a PUCCH, therefore, the terminal may not transmit the feedback information on the first uplink physical resource. It is not difficult to understand that at this time all transmission of the feedback information on the first uplink physical resource is actually cancelled.

Further, when the time interval between the physical channel carrying the second signaling and the first uplink physical resource is less than the first time length threshold, it means that the terminal does not have time to stop to process a PUCCH, and therefore, in this case, the terminal may transmit the feedback information on the first uplink physical resource.

As an example, if the time interval between the physical channel carrying the second signaling and the first uplink physical resource is greater than or equal to the first time length threshold, cancelling transmission of the feedback information on the first uplink physical resource may include: cancelling transmission of the feedback information on the first uplink physical resource if the time interval between an ending symbol of the physical channel carrying the second signaling and a starting symbol of the first uplink physical resource is greater than or equal to the first time length threshold.

That is to say, a time length corresponding to a time domain from the ending symbol of the physical channel carrying the second signaling to the starting symbol of the first uplink physical resource is counted, and if the time length is greater than or equal to the first time length threshold, the feedback information is not transmitted on the first uplink physical resource.

Figure 7:
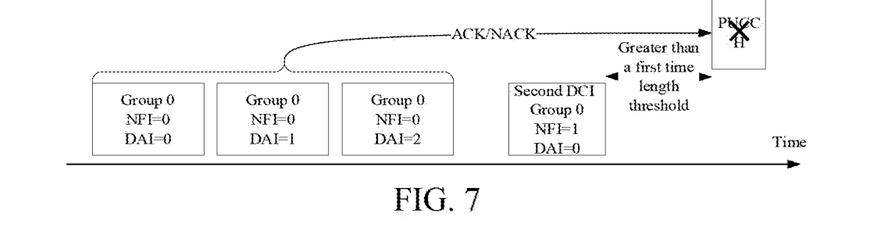
FIG. 7 is a schematic diagram of information corresponding to a downlink physical channel group according to another exemplary embodiment of the present application.

For example, referring to FIG. 7, a time interval between an ending symbol of a physical channel carrying a second signaling and a starting symbol of a PUCCH is greater than the first time length threshold, it means that a terminal has time to process the PUCCH, so the feedback information may not be transmitted on the first uplink physical resource.

It should be noted that the above description is only made by taking an example of cancelling transmission of the feedback information on the first uplink physical resource if the time interval between the ending symbol of the physical channel carrying the second signaling and the starting symbol of the first uplink physical resource is greater than or equal to the first time length threshold. In another embodiment, other combinations of a starting symbol and an ending symbol are not excluded to determine in which time period to cancel transmission of feedback information on a first uplink physical resource, which is not limited in the embodiments of the present application.

As an example, a specific implementation of cancelling transmission of the feedback information on the first uplink physical resource may include: cancelling transmission of the feedback information on the first uplink physical resource after a target time point, wherein the target time point is determined based on an ending symbol of a physical channel carrying the second signaling and a second time length threshold.

As an example, the second time length threshold is a downlink physical channel processing time length; or, the second time length threshold is configured by a network side device; or, the second time length threshold is predefined.

In addition, the being determined based on the ending symbol of the physical channel carrying the second signaling and the second time length threshold as described herein means: being determined based on a position corresponding to the ending symbol of the physical channel carrying the second signaling and the second time length threshold.

That is to say, the terminal may determine an earliest cancellation time domain position for cancelling the transmission of the feedback information on the first uplink physical resource, and then from the earliest cancellation time domain position cancel the transmission of the feedback information on the first uplink physical resource. Here, the earliest cancellation time domain position is the target time point. As an example, the target time point may be obtained after the second time length threshold is added to the ending symbol of the physical channel carrying the second signaling, i.e., after the second time length threshold is added to a position corresponding to the ending symbol of the physical channel carrying the second signaling.

As another example, a specific implementation of cancelling transmission of the feedback information on the first uplink physical resource may include: determining a target time point, the target time point being determined based on an ending symbol of a physical channel carrying the second signaling and a second time length threshold, and cancelling transmission of the feedback information on the first uplink physical resource from the target time point if the target time point is within the first uplink physical resource.

Exemplarily, the target time point being within the first uplink physical resource may include: the target time point coincides with a starting symbol of the first uplink physical resource; or, the target time point is after a starting symbol of the first uplink physical resource and before an ending symbol of the first uplink physical resource; or, the target time point coincides with an ending symbol of the first uplink physical resource possibly.

If the target time point is within the first uplink physical resource, it means that the terminal may partially transmit the feedback information on the first uplink physical resource, and interrupt transmission of the feedback information after the target time point. That is, the terminal may determine a time point at which transmission of the feedback information on the first uplink physical resource is interrupted, i.e., determine a target time point. The target time point may be within the first uplink physical resource, for example, referring to FIG. 8 for details, in this case, the terminal actually transmits feedback information from a starting symbol of the first uplink physical resource to a target time point. After the target time point, the terminal interrupts transmitting the feedback information on the first uplink physical resource, i.e., in fact, the terminal cancels partial transmission of the feedback information on the first uplink physical resource.

Figure 8:
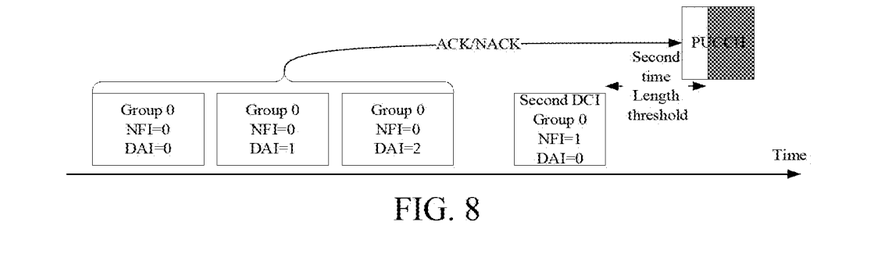
FIG. 8 is a schematic diagram of information corresponding to a downlink physical channel group according to another exemplary embodiment of the present application.

Of course, it is not difficult to understand that if the target time point coincides with the starting symbol of the first uplink physical resource, at this time all transmission of the feedback information on the first uplink physical resource is actually cancelled.

As an example, a specific implementation of cancelling transmission of the feedback information on the first uplink physical resource may include: determining a target time point, the target time point being determined based on an ending symbol of the physical channel carrying the second signaling and a second time length threshold, and cancelling transmission of the feedback information on the first uplink physical resource if the target time point is before a starting symbol of the first uplink physical resource.

In this implementation, it means that, from an ending symbol of a physical resource transmitting the second signaling and after addition of a second time length threshold, an earliest cancellation time domain position for cancelling transmission of a first uplink physical resource, i.e., the target time point, is determined. The target time point is before a starting symbol of the first uplink physical resource, and after the target time point, transmission of feedback information on the first uplink physical resource is cancelled. It is not difficult to understand that in this case, it is equivalent to cancelling all transmission of the feedback information on the first uplink physical resource.

In an embodiment of the present application, a first signaling is received, and it is determined to transmit feedback information corresponding to a first downlink physical channel group on a first uplink physical resource according to the first signaling. If a second signaling is received before the first uplink physical resource, transmission of the feedback information on the first uplink physical resource may be cancelled, wherein the second signaling is used for indicating new feedback indication information corresponding to the first downlink physical channel group.

The above description is made by taking a case where the information processing method is performed by a terminal as an example. In another possible implementation of the present application, the information processing method may also be performed by a network side device, and the information processing method may also include the following implementation acts A and B.

In act A, a first signaling is sent, the first signaling being used for indicating a terminal to transmit feedback information corresponding to a first downlink physical channel group on a first uplink physical resource.

The network side device sends the first signaling to indicate a terminal to transmit the feedback information corresponding to the first downlink physical channel group on the first uplink physical resource. A specific implementation principle thereof is similar to an implementation principle of a terminal side, and reference may be made to the act 301 in the above embodiment of FIG. 3.

In act B, a second signaling is sent before the first uplink physical resource, the second signaling being used for indicating to cancel transmission of the feedback information on the first uplink physical resource.

Further, the second signaling is used for indicating new feedback indication information corresponding to the first downlink physical channel group, and reference may be made to the above description for specific relevant description.

In some cases, the network side device may need to reorganize first downlink physical resources in the first downlink physical resource group. In such a case, the second signaling may be sent to the terminal to indicate, through the second signaling, the terminal to cancel transmission of the feedback information on the first uplink physical resource; then for the terminal, the feedback information corresponding to the first downlink physical resource group is released.

As an example, the method may further include: the feedback information is not received on the first uplink physical resource.

Since the second signaling is used for indicating the terminal to cancel transmission of the feedback information on the first uplink physical resource, that is, the terminal will not transmit feedback information on the first uplink physical resource, or will not transmit all the feedback information on the first uplink physical resource, the network side device may not expect to receive the feedback information on the first uplink physical resource after sending the second signaling. In this way, blind detection of the network side device may be avoided, thereby saving power consumption of the network side device.

In an embodiment of the present application, a first signaling is sent, the first signaling being used for indicating a terminal to transmit feedback information corresponding to a first downlink physical channel group on a first uplink physical resource. A second signaling is sent before the first uplink physical resource to indicate, through the second signaling, the terminal to cancel transmission of the feedback information on the first uplink physical resource. In this way, the terminal may release the feedback information corresponding to the first downlink physical channel group.

Figure 9:
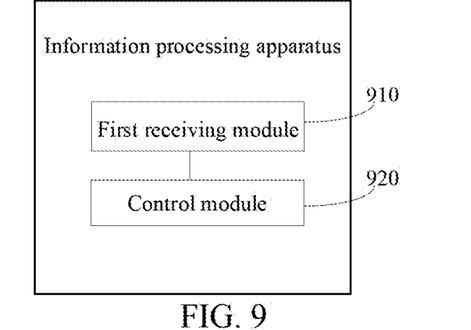
FIG. 9 is a schematic diagram of a structure of an information processing apparatus according to an exemplary embodiment of the present application.

FIG. 9 is a schematic diagram of a structure of an information processing apparatus according to an exemplary embodiment. The apparatus may include a first receiving module 910 and a control module 920.

The first receiving module 910 is configured to receive a first signaling, the first signaling being used for indicating a terminal to transmit feedback information corresponding to a first downlink physical channel group on a first uplink physical resource.

The control module 920 is configured to not acquire a second signaling before the first uplink physical resource, the second signaling being used for indicating new feedback indication information corresponding to the first downlink physical channel group.

In a possible implementation of the present application, the before the first uplink physical resource includes: before a starting symbol of the first uplink physical resource; or, before an ending symbol of the first uplink physical resource.

In a possible implementation of the present application, the control module 920 is configured to: not acquire the second signaling between a physical channel carrying the first signaling and the first uplink physical resource.

In a possible implementation of the present application, the control module 920 is configured to: not acquire the second signaling between an ending symbol of a physical channel carrying the first signaling and a starting symbol of the first uplink physical resource; or, not acquire the second signaling between an ending symbol of a physical channel carrying the first signaling and an ending symbol of the first uplink physical resource.

In a possible implementation of the present application, a first downlink physical channel in the first downlink physical channel group is a Physical Downlink Shared Channel (PDCCH) or a Physical Downlink Control Channel (PDCCH).

In a possible implementation of the present application, the first signaling is first downlink control information (DCI), and the second signaling is second DCI, and new feedback indication information in the second DCI is toggled relative to new feedback indication information in the first DCI.

In a possible implementation of the present application, the control module 920 is configured to: not detect the second signaling; or, not perform an operation indicated by the second signaling.

In an embodiment of the present application, a first signaling is received, and it is determined to transmit feedback information corresponding to a first downlink physical channel group on a first uplink physical resource according to the first signaling. Before the first uplink physical resource, a second signaling may not be acquired or may not be expected to be received, the second signaling being used for indicating new feedback indication information corresponding to the first downlink physical channel group. That is, if the second signaling is received before the first uplink physical resource, the second signaling is ignored.

Figure 10:
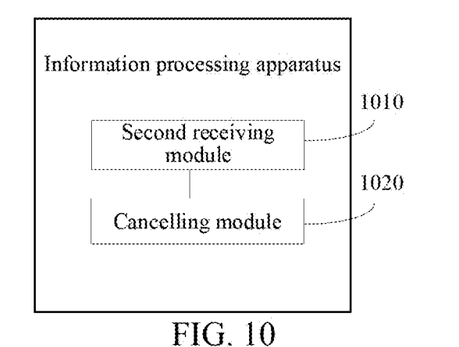
FIG. 10 is a schematic diagram of a structure of an information processing apparatus according to another exemplary embodiment of the present application.

Referring to FIG. 10, FIG. 10 is a schematic diagram of a structure of an information processing apparatus according to another exemplary embodiment. The apparatus includes a second receiving module 1010 and a cancelling module 1020.

The second receiving module 1010 is configured to receive a first signaling, the first signaling being used for indicating a terminal to transmit feedback information corresponding to a first downlink physical channel group on a first uplink physical resource.

The cancelling module 1020 is configured to cancel transmission of the feedback information on the first uplink physical resource when a second signaling is received before the first uplink physical resource, the second signaling being used for indicating new feedback indication information corresponding to the first downlink physical channel group.

In a possible implementation of the present application, the cancelling module 1020 is configured to: cancel all transmission of the feedback information on the first uplink physical resource.

In a possible implementation of the present application, the cancelling module 1020 is configured to: cancel transmission of the feedback information on the first uplink physical resource if a time interval between a physical channel carrying the second signaling and the first uplink physical resource is greater than or equal to a first time length threshold.

In a possible implementation of the present application, the cancelling module 1020 is configured to: cancel transmission of the feedback information on the first uplink physical resource if a time interval between an ending symbol of a physical channel carrying the second signaling and a starting symbol of the first uplink physical resource is greater than or equal to the first time length threshold.

In a possible implementation of the present application, the first time length threshold is a downlink physical channel processing time length; or, the first time length threshold is configured by a network side device; or, the first time length threshold is predefined.

In a possible implementation of the present application, the cancelling module 1020 is configured to: cancel partial transmission of the feedback information on the first uplink physical resource.

In a possible implementation of the present application, the cancelling module 1020 is configured to: cancel transmission of the feedback information on the first uplink physical resource after a target time point, wherein the target time point is determined based on an ending symbol of a physical channel carrying the second signaling and a second time length threshold.

In a possible implementation of the present application, the cancelling module 1020 is configured to: determine a target time point, wherein the target time point is determined based on an ending symbol of a physical channel carrying the second signaling and a second time length threshold; and cancel transmission of the feedback information on the first uplink physical resource from the target time point if the target time point is within the first uplink physical resource.

In a possible implementation of the present application, the cancelling module 1020 is configured to: determine a target time point, wherein the target time point is determined based on an ending symbol of a physical channel carrying the second signaling and a second time length threshold; and cancel transmission of the feedback information on the first uplink physical resource if the target time point is before a starting symbol of the first uplink physical resource.

In a possible implementation of the present application, the second time length threshold is a downlink physical channel processing time length; or, the second time length threshold is configured by a network side device; or, the second time length threshold is predefined.

In a possible implementation of the present application, a first downlink physical channel in the first downlink physical channel group is a PDSCH or a PDCCH.

In a possible implementation of the present application, the first signaling is first downlink control information (DCI), the second signaling is second DCI, and new feedback indication information in the second DCI is toggled relative to new feedback indication information in the first DCI.

In an embodiment of the present application, a first signaling is received, and it is determined to transmit feedback information corresponding to a first downlink physical channel group on a first uplink physical resource according to the first signaling. If a second signaling is received before the first uplink physical resource, transmission of the feedback information on the first uplink physical resource may be cancelled, wherein the second signaling is used for indicating new feedback indication information corresponding to the first downlink physical channel group.

Figure 11:
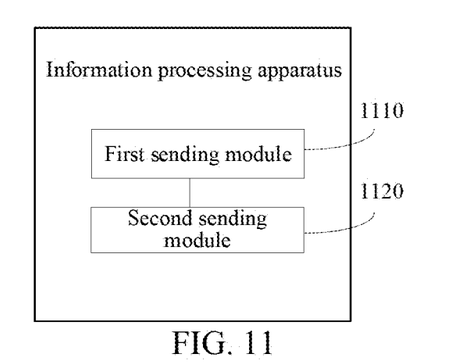
FIG. 11 is a schematic diagram of a structure of an information processing apparatus according to another exemplary embodiment of the present application.

Referring to FIG. 11, FIG. 11 is a schematic diagram of a structure of an information processing apparatus according to an exemplary embodiment. The apparatus may include a first sending module 1110 and a second sending module 1120.

The first sending module 1110 is configured to send a first signaling, the first signaling being used for indicating a terminal to transmit feedback information corresponding to a first downlink physical channel group on a first uplink physical resource.

The second sending module 1120 is configured to send a second signaling before the first uplink physical resource, the second signaling being used for indicating to cancel transmission of the feedback information on the first uplink physical resource.

In a possible implementation of the present application, the second sending module 1120 is further configured to: not receive the feedback information on the first uplink physical resource.

In an embodiment of the present application, a first signaling is sent, the first signaling being used for indicating a terminal to transmit feedback information corresponding to a first downlink physical channel group on a first uplink physical resource. A second signaling is sent before the first uplink physical resource to indicate, through the second signaling, the terminal to cancel transmission of the feedback information on the first uplink physical resource. In this way, the terminal may release the feedback information corresponding to the first downlink physical channel group.

Figure 12:
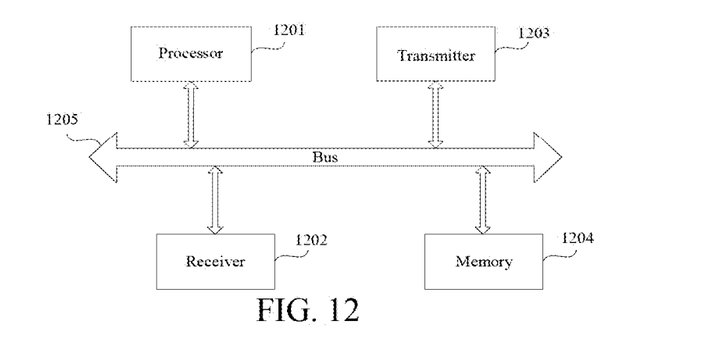
FIG. 12 is a schematic diagram of a structure of a device according to an exemplary embodiment of the present application.

Referring to FIG. 12, FIG. 12 is a schematic diagram of a structure of a device according to an exemplary embodiment of the present application. The device may be a terminal or a network side device, and includes: a processor 1201, a receiver 1202, a transmitter 1203, a memory 1204, and a bus 1205.

The processor 1201 includes one or more processing cores. The processor 1201 performs various functional applications and information processing by running software programs and modules.

The receiver 1202 and the transmitter 1203 may be implemented as a communication assembly, which may be a communication chip.

The memory 1204 is connected to the processor 1201 via the bus 1205.

The memory 1204 may be configured to store at least one instruction, and the processor 1201 is configured to execute the at least one instruction to implement various acts executed by the device in the above various method embodiments.

In addition, the memory 1204 may be implemented by any type of transitory or non-transitory storage device or a combination thereof. The transitory or non-transitory storage device includes, but is not limited to, a magnetic disk or an optical disk, an Electrically Erasable Programmable Read-Only Memory (EEPROM), an Electrically Programmable Read Only Memory (EPROM), a Static Random Access Memory (SRAM), a Read Only Memory (ROM), a magnetic memory, a flash memory, and a Programmable Read Only Memory (PROM).

The present application provides a computer-readable storage medium, storing at least one instruction which is loaded and executed by a processor to implement the methods according to the above various method embodiments.

The present application further provides a computer program product, which, when run on a computer, enables the computer to perform the methods according to the above various method embodiments.

One of ordinary skills in the art may understand that all or part of the acts for implementing the embodiments may be completed through hardware, or may be completed by instructing related hardware through programs, the programs may be stored in a computer-readable storage medium, which may be a Read Only Memory, a magnetic disk, or an optical disk, etc.

The above are only optional embodiments of the present application, which are not intended to limit the present application. Any modification, equivalent substitution, improvement, etc., made within the spirit and principles of the present application shall be included in the protection scope of the present application.

What is claimed is:

1. An information processing method, comprising:
   receiving a first signaling, the first signaling being used for indicating a terminal to transmit feedback information corresponding to a first downlink physical channel group on a first uplink physical resource;
   receiving a second signaling, wherein a value of new feedback indication information corresponding to the first downlink physical channel group indicated by the second signaling is different from a value of new feedback indication information corresponding to the first downlink physical channel group indicated by the first signaling, and the second signaling is transmitted after the first signaling; and
   cancelling transmission of the feedback information; wherein the first signaling is first downlink control information (DCI), the second signaling is second DCI, and the new feedback indication information in the second DCI is toggled relative to the new feedback indication information in the first DCI; wherein a time interval between a physical channel carrying the second signaling and the first uplink physical resource is greater than or equal to a first time length threshold.

2. The method according to claim 1, wherein
   the first time length threshold is a downlink physical channel processing time length; or,
   the first time length threshold is configured by a network side device; or,
   the first time length threshold is predefined.

3. The method according to claim 1, wherein a first downlink physical channel in the first downlink physical channel group is a Physical Downlink Shared Channel (PDSCH).

4. An information processing method, comprising:
   sending a first signaling, the first signaling being used for indicating a terminal to transmit feedback information corresponding to a first downlink physical channel group on a first uplink physical resource;
   sending a second signaling, wherein a value of new feedback indication information corresponding to the first downlink physical channel group indicated by the second signaling is different from a value of new feedback indication information corresponding to the first downlink physical channel group indicated by the first signaling, and the second signaling is sent after the first signaling; and
   not receiving the feedback information; wherein the first signaling is first downlink control information (DCI), the second signaling is second DCI, and the new feedback indication information in the second DCI is toggled relative to the new feedback indication information in the first DCI; wherein a time interval between a physical channel carrying the second signaling and the first uplink physical resource is greater than or equal to a first time length threshold.

5. The method according to claim 4, wherein
   the first time length threshold is a downlink physical channel processing time length; or,
   the first time length threshold is configured by a network side device; or,
   the first time length threshold is predefined.

6. The method according to claim 4, wherein a first downlink physical channel in the first downlink physical channel group is a Physical Downlink Shared Channel (PDSCH).

7. An information processing apparatus, comprising:
   a receiver, configured to receive a first signaling, the first signaling being used for indicating a terminal to transmit feedback information corresponding to a first downlink physical channel group on a first uplink physical resource;
   a processor, configured to cancel transmission of the feedback information;
   wherein the receiver is further configured to receive a second signaling;
   wherein a value of new feedback indication information corresponding to the first downlink physical channel group indicated by the second signaling is different from a value of new feedback indication information corresponding to the first downlink physical channel group indicated by the first signaling, and the second signaling is transmitted after the first signaling; wherein the first signaling is first downlink control information (DCI), the second signaling is second DCI, and the new feedback indication information in the second DCI is toggled relative to the new feedback indication information in the first DCI; wherein a time interval between a physical channel carrying the second signaling and the first uplink physical resource is greater than or equal to a first time length threshold.

8. The apparatus according to claim 7, wherein
   the first time length threshold is a downlink physical channel processing time length; or,
   the first time length threshold is configured by a network side device; or,
   the first time length threshold is predefined.

9. The apparatus according to claim 7, wherein a first downlink physical channel in the first downlink physical channel group is a Physical Downlink Shared Channel (PDSCH).

* * * * *